US009978266B2

(12) United States Patent
Zhao

(10) Patent No.: US 9,978,266 B2
(45) Date of Patent: May 22, 2018

(54) WIRELESS SWITCH ASSEMBLY, RELAY RETRANSMISSION CONTROL SYSTEM AND MEMORY CARD

(71) Applicant: Dongjing Zhao, Beijing (CN)

(72) Inventor: Dongjing Zhao, Beijing (CN)

( * ) Notice: Subject to any disclaimer, the term of this patent is extended or adjusted under 35 U.S.C. 154(b) by 0 days. days.

(21) Appl. No.: 15/498,754

(22) Filed: Apr. 27, 2017

(65) Prior Publication Data

US 2017/0243476 A1    Aug. 24, 2017

Related U.S. Application Data

(62) Division of application No. 13/809,439, filed as application No. PCT/CN2011/077162 on Jul. 14, 2011, now Pat. No. 9,666,065.

(30) Foreign Application Priority Data

Jul. 14, 2010    (CN) .................... 2010 2 0258089 U
Aug. 30, 2010    (CN) ......................... 2010 1 0266859
(Continued)

(51) Int. Cl.
G08B 17/02 (2006.01)
G08C 17/02 (2006.01)
(Continued)

(52) U.S. Cl.
CPC ............. *G08C 17/02* (2013.01); *G08C 17/00* (2013.01); *G06F 12/10* (2013.01); *G06K 19/07* (2013.01)

(58) Field of Classification Search
CPC ........ G08C 17/02; G08C 17/00; G06K 19/07; G06F 12/10
See application file for complete search history.

(56) References Cited

U.S. PATENT DOCUMENTS 7,355,523 B2 *  4/2008  Sid ..................... H05B 37/0272
                                                    315/312
7,421,247 B2    9/2008  Buckingham et al.
(Continued)

FOREIGN PATENT DOCUMENTS

CN         1570991 A      1/2005
CN       101241639 A      8/2008
(Continued)

OTHER PUBLICATIONS

English translation of the International Search Report dated Sep. 15, 2011, for corresponding International Application No. PCT/CN2011/077162.
(Continued)

*Primary Examiner* — Mohamed Barakat
(74) *Attorney, Agent, or Firm* — David D. Brush; Westman Champlin & Koehler, P.A.

(57) ABSTRACT

A wireless switch assembly, including: a wireless switch having a control switch; a wireless transmitter connected to the control switch and transmitting a corresponding control signal according to the instruction of the control switch; a first identification card pluggably mounted in the wireless switch and connected to the wireless transmitter; a wireless receiver connected to a controller of a controlled piece and communicating with the wireless switch through radio frequency signal or optical signal. The wireless receiver has a second identification card pluggably mounted therein. The wireless assembly can achieve a remote control by a low power consumption wireless transceiver module and matches the wireless switch to the wireless receiver via the identification cards, thus eliminating the need for complicated control wiring, therefore greatly reducing the complexity of wiring, saving electric wires and cables, and reducing cost.

6 Claims, 5 Drawing Sheets

(30) Foreign Application Priority Data

Aug. 30, 2010 (CN) .......................... 2010 1 0266868
Sep. 30, 2010 (CN) .......................... 2010 1 0297969
Nov. 16, 2010 (CN) .......................... 2010 1 0545714

(51) Int. Cl.
*G08C 17/00* (2006.01)
*G06K 19/07* (2006.01)
*G06F 12/10* (2016.01)

(56) References Cited

U.S. PATENT DOCUMENTS

| | | | |
|---|---|---|---|
| 7,590,064 B1 | 9/2009 | Zhang et al. | |
| 8,121,077 B2 | 2/2012 | Yoshida et al. | |
| 2001/0033222 A1* | 10/2001 | Nowottnick | G07C 9/00309 340/5.61 |
| 2004/0089717 A1* | 5/2004 | Harari | G06F 13/387 235/441 |
| 2005/0035873 A1 | 2/2005 | Kimura | |
| 2005/0057195 A1 | 3/2005 | Murlasits | |
| 2005/0144361 A1* | 6/2005 | Gonzalez | G06F 12/0246 711/103 |
| 2006/0131430 A1* | 6/2006 | Ito | G06K 19/072 235/492 |
| 2007/0081346 A1 | 4/2007 | Spinello | |
| 2007/0091166 A1 | 4/2007 | Mossakowski | |
| 2007/0241932 A1 | 10/2007 | Otero et al. | |
| 2008/0062337 A1 | 3/2008 | Maier | |
| 2009/0296626 A1 | 12/2009 | Hottinen et al. | |
| 2010/0165589 A1* | 7/2010 | Zhou | G06K 7/0021 361/759 |
| 2011/0026451 A1 | 2/2011 | Cui et al. | |
| 2011/0047291 A1 | 2/2011 | Ishii et al. | |
| 2011/0291586 A1 | 12/2011 | Komagata et al. | |

FOREIGN PATENT DOCUMENTS

| | | |
|---|---|---|
| CN | 201222265 Y | 4/2009 |
| CN | 101958742 A | 1/2011 |
| CN | 101976064 A | 2/2011 |
| CN | 101976065 A | 2/2011 |

OTHER PUBLICATIONS

Office Action dated Sep. 22, 2016 for corresponding U.S. Appl. No. 13/809,439, filed Jan. 10, 2013.
Advisory Action dated May 6, 2016 for corresponding U.S. Appl. No. 13/809,439, filed Jan. 10, 2013.
Final Office Action dated Feb. 22, 2016 for corresponding U.S. Appl. No. 13/809,439, filed Jan. 10, 2013.
Office Action dated Aug. 12, 2015 for corresponding U.S. Appl. No. 13/809,439, filed Jan. 10, 2013.
Advisory Action dated May 5, 2015 for corresponding U.S. Appl. No. 13/809,439, filed Jan. 10, 2013.
Final Office Action dated Feb. 27, 2015 for corresponding U.S. Appl. No. 13/809,439, filed Jan. 10, 2013.
Office Action dated Aug. 13, 2014 for corresponding U.S. Appl. No. 13/809,439, filed Jan. 10, 2013.
English translation of the International Written Opinion dated Sep. 15, 2011, for corresponding International Application No. PCT/CN2011/077162.
Office Action dated Aug. 9, 2017 for corresponding U.S. Appl. No. 15/635,977, filed Jun. 28, 2017.

* cited by examiner

WIRELESS SWITCH ASSEMBLY, RELAY RETRANSMISSION CONTROL SYSTEM AND MEMORY CARD

CROSS-REFERENCE TO RELATED APPLICATIONS

This Application is a Divisional Application of U.S. patent application Ser. No. 13/809,439, filed Jan. 10, 2013, which is a Section 371 National Stage Application of International Application No. PCT/CN2011/077162, filed Jul. 14, 2011, and published as WO 2012/006957 A1 on Jan. 19, 2012, not in English, which claims benefit of Chinese Patent Application Serial No(s). 201020258089.9, filed Jul. 14, 2010; 201010266868.8, filed Aug. 30, 2010; 201010266859.9, filed Aug. 30, 2010; 201010297969.1, filed Sep. 30, 2010, and 201010545714.2, filed Nov. 16, 2010, the contents of which are hereby incorporated by reference in their entireties.

FIELD

The present disclosure relates to the field of electric apparatus manufacture, and more particularly to a switch assembly, a relay forwarding control system and a memory card which applies to an industrial apparatus or an electric apparatus such as a lighting device or a home appliance.

BACKGROUND

With continuous improvement of people's lives, a diversity of a home appliance and a lighting apparatus in a house becomes more and more and a corresponding wire layout for controlling these devices becomes more and more complex. Currently, a wiring switch control mode is mainly used. In this way, with an increase of a number of electric apparatuses, a electric wire routing complexity for control is also increased greatly; in addition, a plenty of wires and cables made of copper or aluminum will be consumed, so that a cost is very high.

With wide use of a low-voltage electric apparatus such as an LED lamp, a wireless control switch becomes possible. Currently, a technique of remotely controlling a lighting lamp apparatus using infrared rays also appears. However, it has some defects. For example, infrared remote control has high cost and may control only one predetermined apparatus, thus not applying to a complex system because infrared remote control may not match with a plurality of apparatuses. In addition, for a complex controlling system such as lighting in a building, a plenty of wires and cables need to be laid out, thus not only bringing difficulty to installation and maintenance, but also possibly causing serious safety problems such as leakage of electricity or fire disaster due to aging wires or short circuit. Therefore, there is an urgent need for adoption of the wireless control switch.

SUMMARY

The present disclosure is directed to solve at least one of the problems existing in the prior art. Accordingly, a switch assembly, a relay forwarding control system and a memory card are provided, which apply to control an electric apparatus such as a lighting device or a home appliance.

According to an aspect of the present disclosure, a switch assembly is provided. The switch assembly comprises: a wireless switch, comprising: a control switch, a wireless transmitter connected with the control switch for transmitting a corresponding control signal according to an instruction from the control switch, a first identification card, pluggably mounted in the wireless switch and connected with the wireless transmitter; and a wireless receiver, connected with a controller of a controlled component, communicating with the wireless switch via a radiofrequency signal or an optical signal, and having a second identification card pluggably mounted in the wireless receiver, in which corresponding identity codes are set in the first identification card and the second identification card respectively, the wireless receiver first determines whether an identity code carried by the control signal matches with an identity code set in the second identification card after receiving the control signal from the wireless switch, and only when the identity code carried by the control signal matches with the identity code set in the second identification card, the wireless receiver feeds the control signal back to the controller and the controller controls the controlled component according to the control signal.

In one embodiment, the controlled component is a lighting device, and the controller is a electrical relay, a dimmer switch, a coupler or a thyristor for controlling the lighting device.

In one embodiment, there are a plurality of wireless switches and a plurality of wireless receivers working at frequencies matching each other respectively, and the plurality of wireless switches match with the plurality of wireless receivers according to identity codes set in the first identification cards and the second identification cards.

In one embodiment, the first identification card and the second identification card are both field programmable.

In one embodiment, the first identification card and the second identification card are pluggably mountable to and demountable from the wireless switch and the wireless receiver through an IC memory card slot or a chip socket respectively.

In one embodiment, the wireless switch further comprises: a photovoltaic component, set on a panel of the wireless switch; and a rechargeable battery or a super capacitor, connected with the photovoltaic component for storing an electric energy generated by the photovoltaic component and supplying power to the wireless switch.

In one embodiment, there are one wireless switch and a plurality of wireless receivers, in which at least one identity code set in the second identification cards in the plurality of wireless receivers matches with the identity code set in the first identification card in the wireless switch; there are a plurality of wireless switches and one wireless receiver, in which at least one identity code set in the first identification cards in the plurality of wireless switches matches with the identity code set in the second identification card in the wireless receiver; or there are a plurality of wireless switches and a plurality of wireless receivers, in which a plurality of identity codes are set in the first identification cards in the plurality of wireless switches and in the second identification cards in the plurality of wireless receivers respectively.

In one embodiment, wireless channel assignment codes are stored in the first identification card and the second identification card respectively for assigning corresponding wireless channels for apparatuses in which the first identification card and the second identification card are inserted respectively.

In one embodiment, apparatus type codes each corresponding to one apparatus are also stored in the first identification card and the second identification card respectively.

In one embodiment, cipher keys matching each other are also stored in the first identification card and the second identification card respectively.

The wireless switch assembly according to an embodiment of the present disclosure has the following advantages.

(1) With the switch assembly according to an embodiment of the present disclosure, remote control may be achieved by a wireless transmitting and receiving module with low power consumption, and consequently complex electrical wiring for control is not required, thus reducing a complexity of electrical wiring greatly, saving wires and cables, and thus saving the cost. The switch assembly according to an embodiment of the present disclosure may not only apply to home lighting systems and electric apparatus systems, but also apply to industrial control apparatuses only needing simple control. Compared with a conventional infrared structure or other conventional wireless radiofrequency structures, the switch assembly has greater advantages.

(2) The pluggably identification cards are used to match the wireless switch and the wireless receiver, so that the wireless switch and the wireless receiver may be mass-produced without worrying about a matching problem. In one application area, even if a plurality of the wireless switches and a plurality of the wireless receivers work at the same wireless channel, confusion may not occur, thus extending an application range of the switch assembly according to an embodiment of the present disclosure. In addition, the wireless switches and the wireless receivers may be mass-produced, which may further reduce the cost, thus having a good market prospect.

(3) Identity codes may be written in the identification cards, which may be pluggably mounted or demounted in a wireless switch and a wireless control device in an onsite plugging or unplugging manner, so as to achieve matching between the wireless switch and the wireless receiver. With the switch assembly according to an embodiment of the present disclosure, a complex control network between large number of switches and apparatus may be achieved by setting different identity codes, and the identity codes may be stored in an field programmable IC memory card or memory chip, so that the user may set an identity code assigned for an apparatus based on the onsite requirement. Therefore, for any complex network or user's requirement, a corresponding control relationship may be set by matching identity cards with identity codes, and control relationship may be only achieved between a wireless switch and a wireless receiver which plugged into the identity cards having the same identity code. As a result, with the switch assembly according to an embodiment of the present disclosure, customized services may be provided to the user, and the user only need to assign corresponding identity codes to pluggably identity cards for each wireless switch and each wireless receiver.

(4) With the switch assembly according to an embodiment of the present disclosure, because matching through identity codes in pluggably identity cards is adopted, all the wireless switches and all the wireless receivers may work at a same wireless channel, thus not only avoiding occupancy for precious channel resources, but also reducing manufacturing cost of the wireless switches and the wireless receivers greatly. In addition, in some embodiments, an IC memory card slot or a chip socket is set up in the wireless switch and the wireless receiver respectively, thus pluggably mounting or demounting the IC memory card or the memory chip at any time and providing convenience for user's onsite operation.

According to another aspect of the present disclosure, a relay forwarding control system is provided. The relay forwarding control system comprises: a first wireless control device, controlling a first controlled strong electricity component, having a first receiving identity code and a first transmitting identity code, and configured to control the first controlled strong electricity component according to a control instruction after a matched control instruction is received based on the first receiving identity code and to forward the control instruction to a next hop wireless control device based on the first transmitting identity code; and a plurality of wireless relay control devices, each controlling one controlled strong electricity component, and each having a corresponding receiving identity code and a corresponding transmitting identity code, in which the receiving identity code of each wireless relay control device matches with the transmitting identity code of a previous hop wireless control device, the transmitting identity code of the each wireless relay control device matches with the receiving identity code of a next hop wireless control device, and each wireless relay control device is configured to control a corresponding controlled strong electricity component according to a control instruction after the control instruction matching with the receiving identity code of each wireless relay control device is received and to forward the control instruction to a next hop wireless control device based on the transmitting identity code of each wireless relay control device, in which the next hop wireless control device is at a predetermined distance from the previous hop wireless control device.

In one embodiment, each wireless relay control device forwards the control instruction to the next hop wireless control device according to the transmitting identity code of each wireless relay control device after a predetermined time.

In one embodiment, each wireless control device has an IC memory card slot or a chip socket, and an IC memory card or a memory chip pluggably mounted in the IC memory card slot or the chip socket, in which a corresponding receiving identity code and a corresponding transmitting identity code are set in the IC memory card or the memory chip, and the IC memory card or the memory chip is field programmable; or each wireless control device comprises a wireless receiving and transmitting chip which comprises a field programmable memory and is pluggably mounted in each wireless control device.

In one embodiment, a receiving wireless channel assignment code and/or a transmitting wireless channel assignment code are also set in the IC memory card, the memory chip or the wireless receiving and transmitting chip, and each wireless control device transmits and/or receives the control instruction at a wireless channel assigned according to the receiving wireless channel assignment code and/or the transmitting wireless channel assignment code.

In one embodiment, a checking code is also set in the IC memory card, the memory chip or the wireless receiving and transmitting chip, each wireless control device determines whether the received transmitting identity code of the previous hop wireless control device is correct, and if not, the each wireless control device sends a failure feedback to the previous hop wireless control device or requires the previous hop wireless control device to retransmit.

In one embodiment, each wireless control device further comprises a state detection module and has an independent identification, and the state detection module is configured to detect a state of a controlled strong electricity component and to feed a detection result and the independent identification back to the previous hop wireless control device.

The relay forwarding wireless control system according to an embodiment of the present disclosure has the following advantages.

(1) With the relay forwarding control system according to an embodiment of the present disclosure, the control instruction is transferred by the plurality of wireless relay control devices hop by hop, thus achieving a long control range. Moreover, use of expensive GSM/CMDA modules may be avoided, thus reducing the cost greatly. Very good effect may be achieved especially in an environment such as a street lamp or a building lighting control system.

(2) With the relay forwarding control system according to an embodiment of the present disclosure, a very complex control network between a large number of switches and apparatus may be conveniently configured by the pluggable IC memory card or the pluggable memory chip. Moreover, because the IC memory card or the memory chip is pluggable, the wireless control devices may be produced in a uniform standard, thus reducing the production cost largely.

(3) With the relay forwarding control system according to an embodiment of the present disclosure, matching among wireless control devices in every hop may be achieved by the use of the identity codes, and only when the transmitting identity code of a previous hop wireless control device matches with the receiving identity code of this hop wireless control device, the controlled strong electricity component may be controlled. In some embodiments, street lamps in a whole street or a whole region may be controlled using the relay forwarding control system according to an embodiment of the present disclosure. In one embodiment, in order to avoid big load impact on a grid, each wireless relay control device forwards the control instruction to the next hop wireless control device after a predetermined time. Therefore, all the street lamps in a whole street may not be turned on simultaneously, thus reducing the big load impact on the grid.

(4) With the relay forwarding control system according to an embodiment of the present disclosure, because a receiving wireless channel assignment code and/or a transmitting wireless channel assignment code are also set in the IC memory card or the memory chip, each wireless control device may use an assigned receiving channel and/or an assigned transmitting channel according to the channel assignment codes, thus effectively avoiding channel interference among a plurality of wireless control devices. Furthermore, since flexible assignment may be achieved through present disclosure, the user may reduce the luminance of some lamps or turn off some lamps according to different periods of time or requirements, thus saving energy greatly and conforming to green and environment-friendly ideas.

According to yet another aspect of the present disclosure, a memory card for matching wireless apparatuses or identifying a wireless apparatus is provided. The memory card comprises: a memory card body, with a plurality of regions for containing a plurality of memory chips; and a plurality of memory chips, storing identity codes, and connected with the memory card body through a plurality of breakable connection structures to fix the plurality of memory chips in corresponding regions respectively, in which identity codes stored in at least part of the plurality of memory chips are associated with each other.

In one embodiment, identity codes stored in at least part of the plurality of memory chips are identical with each other for matching the wireless apparatuses.

In one embodiment, a wireless channel assignment code is also stored in each memory chip for assigning a corresponding wireless channel for an apparatus in which each memory chip is inserted.

In one embodiment, apparatus type codes each corresponding to one apparatus are also stored in each memory chip.

In one embodiment, each memory chip adopts a cryptographic algorithm and a cipher key which match with each other.

In one embodiment, each memory chip is a single line memory, a read-only memory, a programmable memory, Flash memory or EEPROM.

The memory card according to an embodiment of the present disclosure has the following advantages.

(1) With the memory card according to an embodiment of the present disclosure, by setting a plurality of associated memory chips in one memory card, the user may match the wireless control assembly conveniently. Moreover, the memory chips are connected with the memory card body through a plurality of breakable connection structures respectively, thus taking down the memory chips from the memory card is simple. Therefore, for the user, the memory card according to an embodiment of the present disclosure is convenient and easy-to-use; when a wireless switch and a wireless receiver are bought, only a corresponding memory card needs to be bought; for a particular configuration, identification and matching among wireless apparatuses may be achieved by inserting memory chips having the same identity codes; and in one memory card all the matching information (an identity code in each memory chip) required by matching the transmitting and receiving apparatuses which need to be matched are comprised. As a result, the user may only need to pluggably mount memory chips comprising identification and matching information to a corresponding apparatus according to requirements, matching is also very flexible, the user may match a plurality of transmitters and a plurality of receivers together according to requirements by mounting memory chips with same identification codes in these apparatus respectively, and modification or reconfiguration of the apparatus controlling relationships are very convenient and fast.

(2) The memory card according to an embodiment of the present disclosure also has advantages of cost reduction for a manufacturer. With the memory card according to an embodiment of the present disclosure, an apparatus is separated from a matching information (i.e., an identity code in a memory chip), thus wireless switches or receiving control apparatuses may be produced standardly without matching problem; and the required matching information may be achieved by the associated identity codes in the memory card, thus reducing the cost during the production and testing process. Moreover, for a current semiconductor memory production process, such a small-capacity non-volatile memory has very low cost, for example, even as low as a few cents per memory chips, and consequently the price of the whole memory card may be very low, which is economically feasible. With the memory card according to an embodiment of the present disclosure, during the production, the manufacturer may first standardly produce a memory card body, a blank memory chip is disposed on the memory card body, and then the same identity codes are written into all the chips in the card according to requirements to finish the production.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Figure 1:
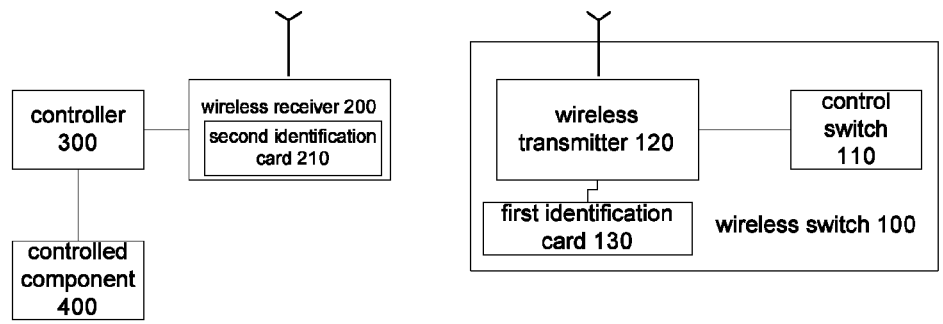
FIG. 1 is a block diagram of a switch assembly according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

FIG. 1 is a block diagram of a switch assembly according to an embodiment of the present disclosure. The switch assembly comprises a wireless switch 100, a wireless receiver 200, a controller 300 and a controlled component 400. The wireless switch 100 comprises a control switch 110, a wireless transmitter 120 and a first identification card 130. The wireless transmitter 120 is connected with the control switch 110 for transmitting a corresponding control signal according to an instruction from the control switch 110. The first identification card 130 is pluggably mounted in the wireless switch 110 and connected with the wireless transmitter 120. The wireless receiver 200 is connected with the controller 300 of the controlled component 400, communicates with the wireless switch 100 via a radiofrequency signal or an optical signal, and has a second identification card 210 pluggably mounted in the wireless receiver 200. Corresponding identity codes are set in the first identification card 130 and the second identification card 210 respectively, the wireless receiver 200 first determines whether an identity code carried by the control signal matches an identity code set in the second identification card 210 after receiving the control signal from the wireless switch 100, and only when the identity code carried by the control signal matches the identity code set in the second identification card 210, the wireless receiver 200 feeds the control signal to the controller 300 and the controller 300 controls the controlled component 400 according to the control signal.

In one embodiment, corresponding identity codes are set in the first identification card 130 and the second identification card 210 respectively, only when the identity code set in the first identification card 130 matches the identity code set in the second identification card 210, the wireless switch 100 and the wireless receiver 200 may be matched, that is, functions of controlling and being controlled may be achieved. The wireless transmitter 120 is connected with the control switch 110 for transmitting a corresponding control signal according to an instruction from the control switch 110. In some embodiments, the wireless receiver 200 is connected with the controller 300 of the controlled component 400, and communicates with the wireless transmitter 120 via a radiofrequency signal or an optical signal. In one embodiment, the wireless receiver 200 communicates with the wireless transmitter 120 via a radiofrequency signal. The wireless receiver 200 first determines whether an identity code carried by the control signal matches an identity code set in the second identification card 210 after receiving the control signal from the wireless transmitter 120, and only when the identity code carried by the control signal matches the identity code set in the second identification card 210, the wireless receiver 200 feeds the control signal to the controller 300 and the controller 300 controls the controlled component 400 according to the control signal. The identity code may be an identification code constituted by a multi-bit code, for example, 128-bit. Therefore, if the first and second identification cards 130, 210 with very simple functions are customized, a cost is very low, and the first and second identification cards 130, 210 may be used on a large scale. In one embodiment, the first identification card 130 and the second identification card 210 are both programmable. In this way, even for a very complex application scenario, identification codes in the identification cards may be field programmed according to a required topological structure, thus facilitating user's flexible configuration It should be noted that embodiments of the present disclosure may not only apply to wireless switch field, but also apply to infrared remote control field or short-distance wireless transmission field.

Each of the wireless transmitter 120 and the wireless receiver 200 may adopt an ASIC chip which only has normal receiving and transmitting functions, thus further reducing the cost. Certainly, each of the wireless transmitter 120 and the wireless receiver 200 may adopt a commercially available chip, for example, a wireless sensor network chip, a Zigbee chip, a 315M or 433M wireless transceiver module, or a 27/40/62 MHz FM/FSK wireless receiving and transmitting chip.

Figure 2:
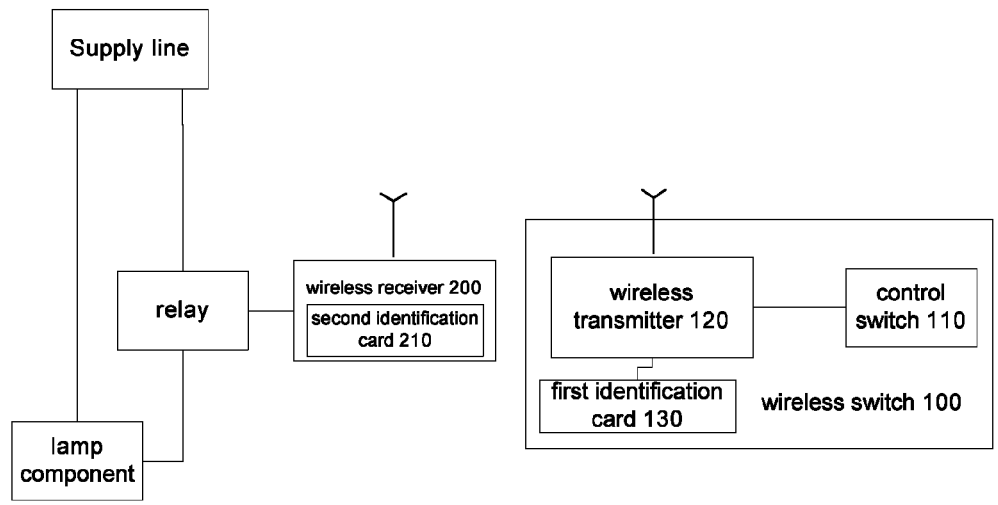
FIG. 2 is a block diagram of a home lighting control according to an embodiment of the present disclosure.

FIG. 2 is a block diagram of a home lighting control according to an embodiment of the present disclosure. In one embodiment, as shown in FIG. 2, the controlled component 400 is a lighting device, and the controller 300 is a relay dimmer switch, a coupler or a thyristor for controlling the lighting device 400 to turn on or off. In this way, because wireless connection is adopted, a switch for controlling the lighting device may be disposed in any position of a room, thus facilitating the use of the user.

In one embodiment, for example, in an application scenario, there may be a plurality of wireless transmitters 120 and a plurality of wireless receivers 200 working at frequencies matching each other, and the plurality of wireless transmitters 120 match the plurality of wireless receivers 200 according to identity codes set in the first identification cards 130 and the second identification cards 210. Maybe one wireless switch 100 matches a plurality of wireless receivers 200 according to identity codes set in the first identification card 130 and the second identification cards 210, maybe one wireless receiver 200 may match a plurality of wireless switches 100 according to identity codes set in the first identification cards 130 and the second identification card 210, maybe a combination thereof is adopted.

As shown in FIG. 2, the switch assembly according to an embodiment of the present disclosure is described by taking home lighting as an example. Certainly, the switch assembly according to an embodiment of the present disclosure may also be used for controlling a home appliance or an industrial control apparatus needing simple control. For example, for a television, infrared control is adopted by a conventional remote controller, so that not only the cost is high, but also the remote controller must face toward the television to control the television. With the switch assembly according to an embodiment of the present disclosure, not only may the cost be reduced, but also the user may control the television in any position of a room. In this embodiment, a control instruction from the wireless transmitter 120 may not only comprise a switching instruction, but also comprise other instructions such as a channel adjustment instruction or a volume adjustment instruction.

In one embodiment, the wireless transmitter 120 may be powered by a battery, so that the wireless switch may be disposed in any position. Certainly, the wireless transmitter 120 may be powered by a supply line of commercial power. Similarly, the wireless receiver 200 may be powered by a battery or a supply line of commercial power.

With the switch assembly according to an embodiment of the present disclosure, remote control may be achieved by a wireless receiving and transmitting module with low power consumption, and consequently complex control wiring is not required, thus reducing a complexity of wiring greatly, saving wires and cables, and saving the cost. The switch assembly according to an embodiment of the present disclosure may not only apply to home lighting systems and electric apparatus, but also apply to industrial apparatuses only needing simple control. Compared with a conventional infrared structure or conventional radiofrequency structures, the wireless switch and the wireless receiver have advantages. Each of the wireless transmitter and the wireless receiver may be an ASIC chip which only has normal receiving and transmitting functions, thus further reducing the cost. Next, the identification cards are used to match the wireless switch and the wireless receiver, so that the wireless switch and the wireless receiver may be mass-produced without a matching problem. In a small space, ever if a plurality of the wireless switches and a plurality of the wireless receivers work at frequencies same with each other, confusion may not occur, thus extending an application range of the switch assembly according to an embodiment of the present disclosure. In addition, the wireless switches and the wireless receivers which are mass-produced may further reduce the cost, thus having very good market outlook.

With the switch assembly according to an embodiment of the present disclosure, an IC memory card slot or a chip socket is innovatively disposed on a transmitting and receiving devices respectively so that the user may change identity codes at any time according to requirements. For example, when selling, a merchant may provide a plurality of pairs of IC memory cards or memory chips to a customer, and a unique identity code is set in each pair of IC memory cards or memory chips, so that the user may mount corresponding IC memory cards or memory chips on the transmitting and receiving devices according to requirements. Alternatively, for a large-scale application scenario, for example, electrical wiring of a building, the user may select a field programmable IC memory card or memory chip. After a corresponding identity code is written in an IC memory card or a memory chip, the IC memory card or the memory chip is mounted into an IC memory card slot or a chip socket, which is very convenient.

Figure 3:
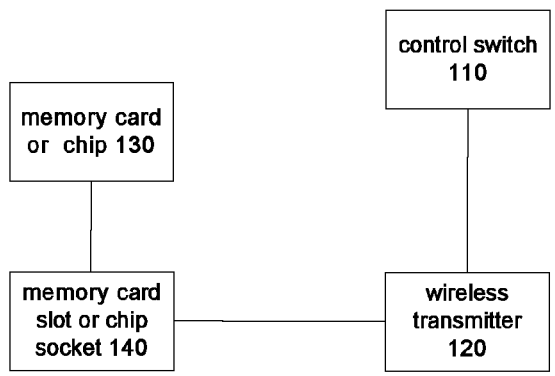
FIG. 3 is a block diagram of a wireless switch for a strong electricity component according to an embodiment of the present disclosure.

FIG. 3 is a block diagram of a wireless switch for a strong electricity component according to an embodiment of the present disclosure. The wireless switch 100 further comprises an IC memory card slot or a chip socket 140. The first identification card 130 may be an IC memory card or a memory chip. The control switch receives a touch of a user for producing a control signal. One or more identity codes are set in the IC memory card or the memory chip 130, and the wireless switch 100 communicates with one or more wireless receivers 200 controlling a strong electricity component and sends the control signal to the one or more wireless receivers 200 when the second identification card 210 and the first identification card 130 have at least one same identity code. After the control switch 110 is touched, the wireless transmitter 120 sends a control instruction according to one or more identity codes set in the IC memory card or the memory chip 130. In this embodiment, the identity codes and the control instruction may be sent together, and the control signal comprises the identity codes and the control instruction. In other embodiments, after modulated using the identity codes, the control instruction may be sent. The IC memory card may be a SIM card.

In one embodiment, the IC memory card or the memory chip 130 may be field programmable, so that the user may write an identity code in the IC memory card or the memory chip 130 according to onsite requirements. Therefore, the user may use the IC memory card or the memory chip 130 conveniently.

In one embodiment, the control switch 110 may comprise a touch switch, for example, a conventional control switch for an electric lamp. In one embodiment, because the switch assembly according to an embodiment of the present disclosure is different from a conventional control switch for an electric lamp and may send a control instruction, the switch assembly according to an embodiment of the present disclosure may have various modes, for example, adding an "ON" button and an "OFF" button on a switch panel or adding a button for controlling a luminance of an electric lamp and a timing button, thus enhancing use and control efficiencies.

In one embodiment, the wireless switch 100 may be powered by a photovoltaic component and a rechargeable battery or a super capacitor. The photovoltaic component is set on a panel of the wireless switch 100. The rechargeable battery or a super capacitor is connected with the photovoltaic component for storing an electric energy generated by the photovoltaic component and supplying power to the wireless switch 100. In one embodiment, the photovoltaic component may be an amorphous silicon solar cell or an organic dye solar cell.

In one embodiment, there are a plurality of wireless switches 100, and each wireless switch 100 corresponds to a certain number of identity codes.

In some embodiments, there are a plurality of control modes, for example, a one-to-one control mode, a one-to-multiple control mode, a multiple-to-one control mode, or even a multiple-to-multiple control mode. For example, the one-to-multiple control mode is as follows: there are one wireless switch 100 and a plurality of wireless receivers 200, in which at least one identity code set in the second identification cards 210 in the plurality of wireless receivers 200 matches the identity code set in the first identification card 130 in the wireless switch 100; the multiple-to-one control mode is as follows: there are a plurality of wireless switches 100 and one wireless receiver 200, in which at least one identity code set in the first identification cards 130 in the plurality of wireless switches 100 matches the identity code set in the second identification card 210 in the wireless receiver 200; and the multiple-to-multiple control mode is as follows: there are a plurality of wireless switches 100 and a plurality of wireless receivers 200, in which a plurality of identity codes set in the first identification cards 130 in the plurality of wireless switches 100 match a plurality of identity codes set in the second identification cards 210 in the plurality of wireless receivers 200.

For example, when the user moves into a door and switches on one wireless switch, the wireless switch may control all lamps in every room, that is, identity codes corresponding to all the lamps in every room are set in the wireless switch, so that the lamp in each room may be turned on by the wireless switch at the door. When the user moves into a living room and wants to turn off lamps in a passage, a kitchen, etc., one wireless switch is also disposed in the living room and may comprise a plurality of components each corresponding to a certain number of identity codes. For example, the wireless switch in the living room comprises two switch components, an identity code corresponding to a lamp in the living room is set in one switch component, and an identity code corresponding to lamps in the passage, the kitchen, etc. is set in the other switch component, so that the user may not only turn off the lamp in the living room by the wireless switch, but also turn off the lamp in the passage or the kitchen. In this example, when the user moves into a bedroom and prepares for sleep, all the lamps may be turned off by a wireless switch in the bedroom. Certainly, the wireless switch in the bedroom may also comprise a plurality of switch components each corresponding to a corresponding identity code.

In the above example, the description of the switch assembly according to an embodiment of the present disclosure by taking a house as an example is for the purpose of illustrating the present disclosure more clearly, however, the switch assembly according to an embodiment of the present disclosure may also apply to a more complex scenario, for example, building lighting control.

The wireless assembly for a complex control network according to an aspect of the present disclosure comprises a plurality of first wireless switches 100 and a plurality of wireless receivers 200. Each wireless receiver 200 is connected with one corresponding controlled component 400 for controlling the controlled component 400 via the controller 300. A plurality of identity codes comprising a first identity code are set in the plurality of wireless receivers 200. The plurality of first wireless switches 100 comprise wireless transmitters 120 communicating with the wireless receivers 200, and a plurality of identity codes comprising the first identity code are set in the plurality of first wireless switches 100. After receiving the touch of the user or an instruction input, one of the plurality of first wireless switches 100 simultaneously communicates with one or more wireless receivers 200 according to the first identity code and sends a control signal, and the plurality of wireless receivers 200 control the controlled component 400 according to the control signal.

In one embodiment, the wireless switch 100 comprises a plurality of control switches 110 each corresponding to a certain number of identity codes. For example, the wireless switch 100 in the living room comprises two control switches 110, an identity code corresponding to a lamp in the living room is set in one control switch 110, and an identity code corresponding to lamps in the passage, the kitchen, etc. is set in the other control switch 110, thus controlling lamps in different positions.

Particular embodiments of the present disclosure will be described below.

Embodiment 1

Figure 4:
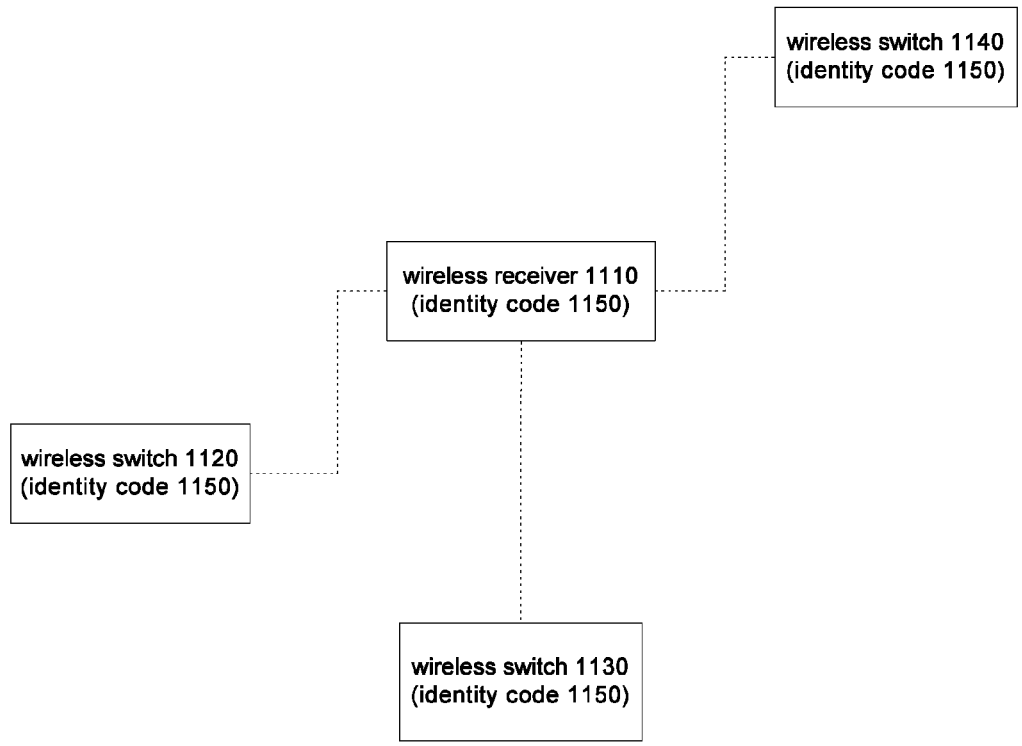
FIG. 4 is a block diagram of a switch assembly for a complex control network according to a first embodiment of the present disclosure.

FIG. 4 is a block diagram of a switch assembly for a complex control network according to a first embodiment of the present disclosure. In this embodiment, a multiple-to-one control mode will be described as an example. The numbers of wireless receivers, wireless switches and identity codes are merely for the purpose of illustration and should not be construed as a limitation. The switch assembly comprises a wireless receiver 1110, a wireless switch 1120, a wireless switch 1130 and a wireless switch 1140. A plurality of identity codes at least comprising an identity code 1150 are set in the wireless receiver 1110. A plurality of identity codes at least comprising the identity code 1150 are set in each of the wireless switch 1120, the wireless switch 1130 and the wireless switch 1140. In this way, by matching of the identity codes, each of the wireless switch 1120, the wireless switch 1130 and the wireless switch 1140 may control the wireless receiver 1110.

Embodiment 2

Figure 5:
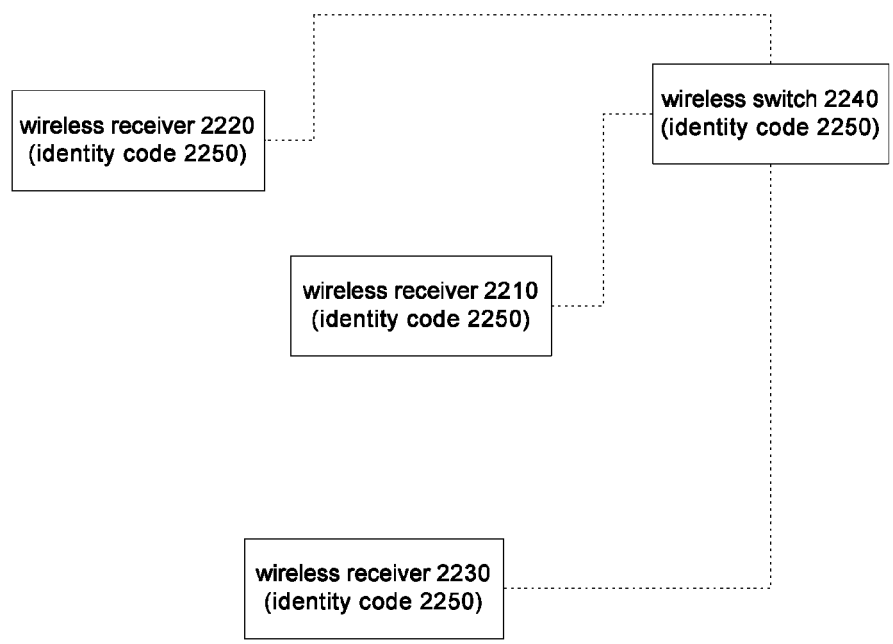
FIG. 5 is a block diagram of a switch assembly for a complex control network according to a second embodiment of the present disclosure.

FIG. 5 is a block diagram of a switch assembly for a complex control network according to a second embodiment of the present disclosure. In this embodiment, a one-to-multiple control mode will be described as an example. The numbers of wireless receivers, wireless switches and identity codes are merely for the purpose of illustration and should not be construed as a limitation. The switch assembly comprises a wireless receiver 2210, a wireless receiver 2220, a wireless receiver 2230 and a wireless switch 2240. A plurality of identity codes at least comprising an identity code 2250 are set in each of the wireless receiver 2210, the wireless receiver 2220 and the wireless receiver 2230. A plurality of identity codes at least comprising the identity code 2250 are set in the wireless switch 2240. In this way, by matching of the identity codes, the wireless switch 2240 may control the wireless receiver 2210, the wireless receiver 2220 and the wireless receiver 2230 simultaneously.

Embodiment 3

Figure 6:
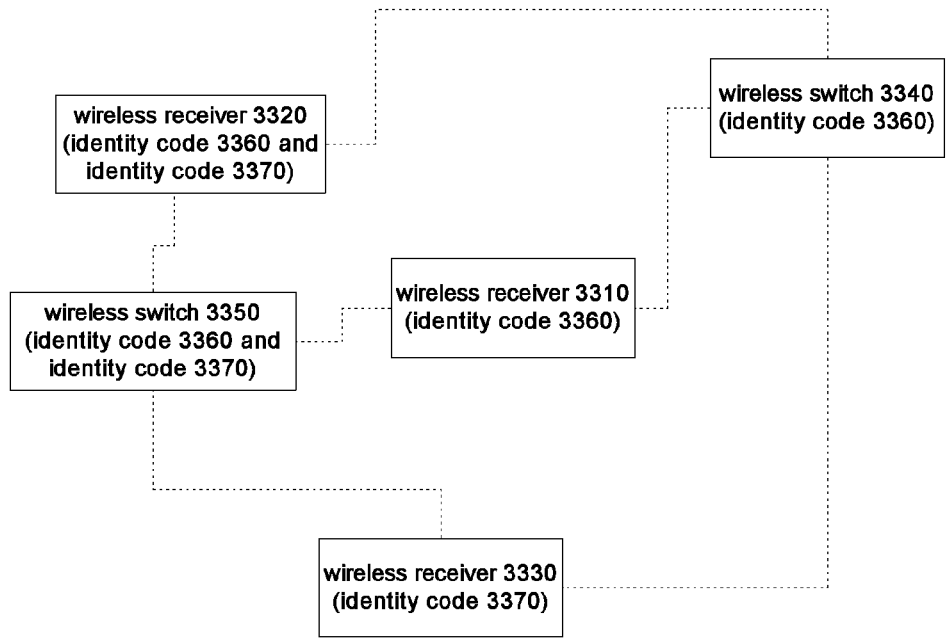
FIG. 6 is a block diagram of a switch assembly for a complex control network according to a third embodiment of the present disclosure.

FIG. 6 is a block diagram of a switch assembly for a complex control network according to a third embodiment of the present disclosure. In this embodiment, a multiple-to-multiple control mode will be described as an example. The numbers of wireless receivers, wireless switches and identity codes are merely for the purpose of illustration and should not be construed as a limitation. The switch assembly comprises a wireless receiver 3310, a wireless receiver 3320, a wireless receiver 3330, a wireless switch 3340, and a wireless switch 3350. A plurality of identity codes are set in each of the wireless receiver 3310, the wireless receiver 3320 and the wireless receiver 3330, the plurality of identity codes set in each of the wireless receiver 3310 and the wireless receiver 3320 at least comprise an identity code 3360, and the plurality of identity codes set in each of the wireless receiver 3320 and the wireless receiver 3330 at least comprise an identity code 3370. A plurality of identity codes at least comprising the identity code 3360 are set in the wireless switch 3340, and a plurality of identity codes at least comprising the identity code 3360 and the identity code 3370 are set in the wireless switch 3350. In this way, in this embodiment, the wireless switch 3340 may control the wireless receiver 3310 and the wireless receiver 3320 simultaneously; and the wireless switch 3350 may control the wireless receiver 3310, the wireless receiver 3320 and the wireless receiver 3330 simultaneously.

In one embodiment, wireless channel assignment codes are stored in the first identification card 130 and the second identification card 210 respectively for assigning corresponding channels for wireless apparatuses in which the first identification card 130 and the second identification card 210 are inserted respectively, thus avoiding interference caused in a large-scale application.

In one embodiment, apparatus type codes each corresponding to one apparatus, for example, a television, a refrigerator, or an electric lamp, are also stored in the first identification card 130 and the second identification card 210 respectively.

In one embodiment, cipher keys matching with each other are also stored in the first identification card 130 and the second identification card 210 respectively for enciphering the control instruction, thus enhancing a reliability and a safety.

The wireless assembly according to an embodiment of the present disclosure has the following advantages.

(1) With the switch assembly according to an embodiment of the present disclosure, remote control may be achieved by a wireless transmitting and receiving module with low power consumption, and consequently complex electrical wiring for control is not required, thus reducing a complexity of electrical wiring greatly, saving wires and cables, and thus saving the cost. The switch assembly according to an embodiment of the present disclosure may not only apply to home lighting systems and electric apparatus systems, but also apply to industrial control apparatuses only needing simple control. Compared with a conventional infrared structure or other conventional wireless radiofrequency structures, the switch assembly has greater advantages.

(2) The pluggably identification cards are used to match the wireless switch and the wireless receiver, so that the wireless switch and the wireless receiver may be mass-produced without worrying about a matching problem at low cost. In one application area, ever if a plurality of the wireless switches and a plurality of the wireless receivers work at the same wireless channel, confusion may not occur, thus extending an application range of the switch assembly according to an embodiment of the present disclosure. In addition, the wireless switches and the wireless receivers may be mass-produced, which may further reduce the cost, thus having a good market prospect.

(3) Identity codes may be written in the identification cards, which may be pluggably mounted or demounted in a wireless switch and a wireless control device in an onsite plugging or unplugging manner, so as to achieve matching between the wireless switch and the wireless receiver. With the switch assembly according to an embodiment of the present disclosure, a complex control network between large number of switches and apparatus may be achieved by setting different identity codes, and the identity codes may be stored in an field programmable IC memory card or memory chip, so that the user may set an identity code assigned for an apparatus based on the onsite requirement. Therefore, for any complex network or user's requirement, a corresponding control relationship may be set by matching identity cards with identity codes, and control relationship may be only achieved between a wireless switch and a wireless receiver which plugged into the identity cards having the same identity code. As a result, with the switch assembly according to an embodiment of the present disclosure, customized services may be provided to the user, and the user only need to assign corresponding identity codes to pluggably identity cards for each wireless switch and each wireless receiver.

(4) With the switch assembly according to an embodiment of the present disclosure, because matching through identity codes in pluggably identity cards is adopted, all the wireless switches and all the wireless receivers may work at a same wireless channel, thus not only avoiding occupancy for precious channel resources, but also reducing manufacturing cost of the wireless switches and the wireless receivers greatly. In addition, in some embodiments, an IC memory card slot or a chip socket is set up in the wireless switch and the wireless receiver respectively, thus pluggably mounting or demounting the IC memory card or the memory chip at any time and providing convenience for user's onsite operation.

Figure 7:
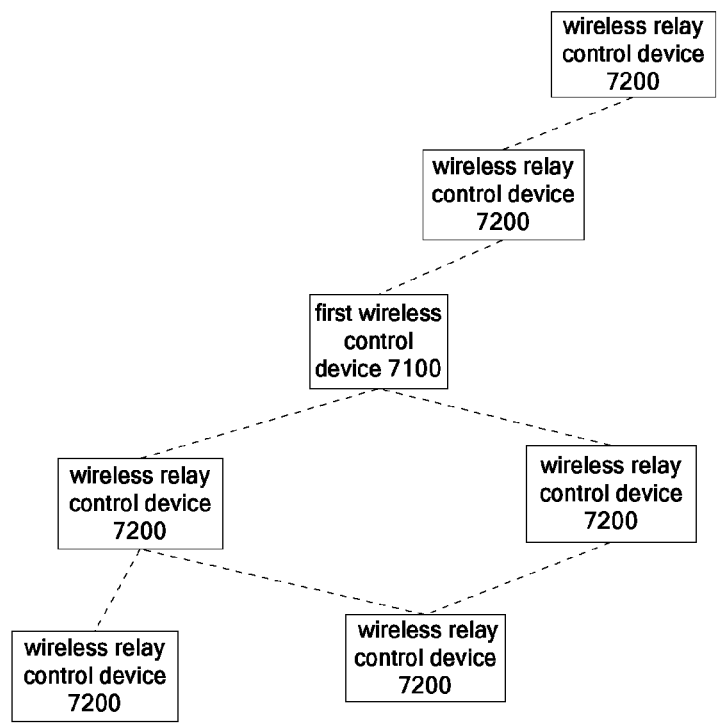
FIG. 7 is a block diagram of a relay forwarding control system for a strong electricity component according to an embodiment of the present disclosure.

FIG. 7 is a block diagram of a relay forwarding control system for a strong electricity component according to an embodiment of the present disclosure. The relay forwarding control system may not only apply to a lighting system such as a street lamp or a building lighting system, but also apply to other control systems for a strong electricity component. The relay forwarding control system comprises a first wireless control device 7100 and a plurality of wireless relay control devices 7200. The plurality of wireless relay control devices 7200 may communicate with each other in a hop-by-hop manner, in a cellular manner, or in other manners, and transfer a control signal.

The first wireless control device 7100 controls a first controlled strong electricity component, has a first receiving identity code and a first transmitting identity code, and is configured to control the first controlled strong electricity component according to a control instruction after a matched control instruction is received according to the first receiving identity code and to forward the control instruction to a next hop wireless relay control device 7200 according to the first transmitting identity code. Each wireless relay control device 7200 controls one controlled strong electricity component, for example, a street lamp, and has a corresponding receiving identity code and a corresponding transmitting identity code. These receiving identity codes and these transmitting identity codes may be identical with or different from each other, which may be determined according to particular application scenarios. However, because a pluggable IC memory card or a pluggable memory chip is used, the user may conveniently use the receiving identity codes and transmitting identity codes in a particular application.

In some embodiments, the receiving identity code of each wireless relay control device 7200 matches the transmitting identity code of a previous hop wireless control device (which may be the first wireless control device 7100 or a previous hop wireless relay control device 7200), the transmitting identity code of the each wireless relay control device 7200 matches the receiving identity code of a next hop wireless control device, and each wireless relay control device 7200 is configured to control a corresponding controlled strong electricity component according to a control signal, for example, control a street lamp to turn on or off, after the control signal matching the receiving identity code of each wireless relay control device 7200 is received. In addition, each wireless relay control device 7200 is further configured to forward the control signal to a next hop wireless control device according to the transmitting identity code of each wireless relay control device 7200, thus achieving relay transfer of the control signal.

In one embodiment, the next hop wireless control device is at a predetermined distance from the previous hop wireless control device, thus could be better applied in complex scenarios such as a multiple street lamp controlling. Therefore, one previous hop wireless control device may simultaneously control a plurality of next hop wireless control devices in the control range of the one previous hop wireless control device.

In order to avoid big load impact on a power grid, in one embodiment, each wireless relay control device 7200 forwards the control signal to the next hop wireless control device according to the transmitting identity code of each wireless relay control device 7200 after a predetermined time. In this way, by self delay of each wireless relay control device 7200, the controlled strong electricity components may not be turned on simultaneously, thus reducing the load impact on the grid.

In one embodiment, the first wireless control device 7100 and each wireless relay control device 7200 each have an IC memory card slot or a chip socket and a pluggable IC memory card or a pluggable memory chip which can be plugged into or unplugged from the IC memory card slot or the chip socket, in which a corresponding receiving identity code and a corresponding transmitting identity code are set in the IC memory card or the memory chip. In one embodiment, the IC memory card or the memory chip is field programmable, so that the user may write the identity codes as well as the channel assignment codes and independent identifications mentioned below into them conveniently. In another embodiment, each wireless control device comprises a wireless receiving and transmitting chip which comprises a field programmable memory. Certainly, in other embodiments, a memory may also be integrated in a chip, provided that field programmability is achieved.

In one embodiment, a receiving channel assignment code and/or a transmitting channel assignment code are also set in the IC memory card, the memory chip or the wireless receiving and transmitting chip, and each wireless control device transmits and/or receives the control signal according to a channel assigned according to the receiving channel assignment code and/or the transmitting channel assignment code, thus effectively avoiding channel interference among a plurality of wireless control devices. Certainly, in some embodiments, because the IC memory card or the memory chip is pluggable, receiving channel assignment codes and/or transmitting channel assignment codes may be set in some wireless control devices, but are not set in the other wireless control devices, for example, receiving channel assignment codes and/or transmitting channel assignment codes may be set in wireless control devices in a street with high density of lamps or where a lot of wireless control devices are placed close to each other, thus facilitating the configuration of the wireless control devices.

In order to prevent loss of the control signal or prevent the wireless control devices from being unable to be normally turned on sequentially due to interference, for example, the rest of wireless control devices will be unable to receive the control signal when one wireless control device receive a wrong identity code from a previous hop wireless control device, in one embodiment, a check code is also set in the IC memory card, the memory chip or the wireless receiving and transmitting chip, each wireless control device determines whether the received transmitting identity code of the previous hop wireless control device is correct, and if not, each wireless control device sends a failure feedback to the previous hop wireless control device or requires the previous hop wireless control device to retransmit, thus avoiding the fact that subsequent wireless control devices may malfunction because one wireless control device does not receive the control signal.

In one embodiment, each wireless control device further comprises a state detection module, for example, for detecting whether a current flows through a controlled strong electricity component so as to detect a state, for example, an on or off state, of the controlled strong electricity component. In one embodiment, each wireless control device has an independent identification set in an IC memory card or a memory chip. The state detection module is configured to detect a state of a controlled strong electricity component and to feed a result and the independent identification back to the previous hop wireless control device. After receiving the detection result and the independent identification, the previous hop wireless control device continues to feed the detection result and the independent identification back, until the detection result and the independent identification are fed back to a control center, thus determining which wireless control device is failed in time and performing repairing and maintenance in time.

In one embodiment, a plurality of receiving identity codes and/or a plurality of transmitting identity codes may be set in each wireless control device, thus achieving one-to-multiple control, multiple-to-one control, or even multiple-to-multiple control.

Figure 8:
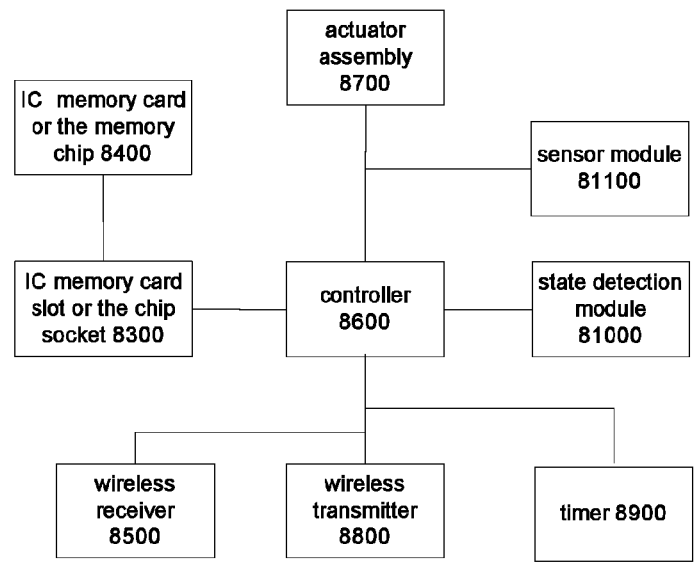
FIG. 8 is a block diagram of a wireless control device according to an embodiment of the present disclosure.

FIG. 8 is a block diagram of a wireless control device according to an embodiment of the present disclosure. The wireless control device comprises an IC memory card slot or a chip socket 8300 and an IC memory card or a memory chip 8400 matching the IC memory card slot or the chip socket 8300, in which a receiving identity code and a transmitting identity code are set in the IC memory card or the memory chip 8400. The receiving identity code set in the IC memory card or the memory chip 8400 matches the transmitting identity code of a previous hop wireless control device, and the transmitting identity code set in the IC memory card or the memory chip 8400 matches the receiving identity code of a next hop wireless control device. The wireless control device further comprises a wireless receiver 8500, a controller 8600, an actuator assembly 8700 and a wireless transmitter 8800. The wireless receiver 8500 receives a control instruction sent by other wireless control devices (for example, a previous hop wireless control device) and transmitting identity codes from other wireless control devices. When the transmitting identity code received by the controller 8600 matches the receiving identity code of the wireless control device, the controller 8600 controls the actuator assembly 8700 according to the control instruction, for example, controls the actuator assembly 8700 to switch on or off, so as to turn on or off the controlled strong electricity component. In addition, the controller 8600 further controls the wireless transmitter 8800 to send the control signal to a next hop wireless control device according to the transmitting identity code of the wireless control device. The actuator assembly 8700 controls the controlled strong electricity component according to the control of the controller 8600. The wireless transmitter 8800 sends the control signal to a next hop wireless control device according to the transmitting identity code of the wireless control device under the control of the controller 8600.

In this embodiment, the wireless control device comprises the IC memory card or the memory chip 8400. However, in other embodiments, the wireless control device may also comprise a wireless receiving and transmitting chip which comprises a field programmable memory, which may also achieve the object of the present disclosure.

In one embodiment, the wireless control device further comprises a timer 8900. The timer 8900 is used for timing, and the controller 8600 ensures the control signal to be sent after delay for a predetermined time.

In one embodiment, a receiving channel assignment code and/or a transmitting channel assignment code are also set in the IC memory card or the memory chip 8400, and the wireless control device transmits and/or receives the control instruction at a wireless channel assigned according to the receiving channel assignment code and/or the transmitting channel assignment code.

In one embodiment, a check code is also set in the IC memory card or the memory chip 8400, the wireless control device determines whether the received transmitting identity code of the previous hop wireless control device is correct, and if not, the wireless control device sends a failure feedback to the previous hop wireless control device or requires the previous hop wireless control device to retransmit.

In one embodiment, the wireless control device further comprises a state detection module 81000, for example, a current detection module, and has an independent identification, and the state detection module 81000 is configured to detect a state of a controlled strong electricity component and to feed a detection result and the independent identification back to the previous hop wireless control device.

In one embodiment, a plurality of receiving identity codes and/or a plurality of transmitting identity code may be set in the wireless control device, thus achieving one-to-multiple control, multiple-to-one control, or multiple-to-multiple control.

In one embodiment, the actuator assembly 8700 may be a relay, a thyristor or a voltage regulator. The control signal may comprise a luminance adjustment instruction, and the controller 8600 controls the voltage regulator according to the luminance adjustment instruction so as to adjust the luminance of the controlled strong electricity component.

In one embodiment, each of the wireless transmitter 8800 and the wireless receiver 8500 may be a wireless sensor network chip, a Zigbee chip, a 315M or 433M wireless transceiver module, a 27/40/62 MHz FM/FSK wireless receiving and transmitting chip, or a custom made RF chip.

In other embodiments, the wireless control device may further comprise a sensor module 81100, for example, a light sensor. The sensor module 81100 may detect current luminance, etc., and provide a detection result to the controller 8600, and the controller 8600 controls the actuator assembly 8700 according to the detection result.

The relay forwarding control system according to an embodiment of the present disclosure has the following advantages.

(1) With the relay forwarding control system according to an embodiment of the present disclosure, the control instruction is transferred by the plurality of wireless relay control devices hop by hop, thus achieving a long control range. Moreover, use of expensive GSM/CMDA modules may be avoided, thus reducing the cost greatly. Very good effect may be achieved especially in an environment such as a street lamp or a building lighting control system.

(2) With the relay forwarding control system according to an embodiment of the present disclosure, a very complex control network between a large number of switches and apparatus may be conveniently configured by the pluggable IC memory card or the pluggable memory chip. Moreover, because the IC memory card or the memory chip is pluggable, the wireless control devices may be produced in a uniform standard, thus reducing the production cost largely.

(3) With the relay forwarding control system according to an embodiment of the present disclosure, matching among wireless control devices in every hop may be achieved by the use of the identity codes, and only when the transmitting identity code of a previous hop wireless control device matches with the receiving identity code of this hop wireless control device, the controlled strong electricity component may be controlled. In some embodiments, street lamps in a whole street or a whole region may be controlled using the relay forwarding control system according to an embodiment of the present disclosure. In one embodiment, in order to avoid big load impact on a grid, each wireless relay control device forwards the control instruction to the next hop wireless control device after a predetermined time. Therefore, all the street lamps in a whole street may not be turned on simultaneously, thus reducing the big load impact on the grid.

(4) With the relay forwarding control system according to an embodiment of the present disclosure, because a receiving wireless channel assignment code and/or a transmitting wireless channel assignment code are also set in the IC memory card or the memory chip, each wireless control device may use an assigned receiving channel and/or an assigned transmitting channel according to the channel assignment codes, thus effectively avoiding channel interference among a plurality of wireless control devices. Furthermore, since flexible assignment may be achieved through present disclosure, the user may reduce the luminance of some lamps or turn off some lamps according to different periods of time or requirements, thus saving energy greatly and conforming to green and environment-friendly ideas.

According to an embodiment of the present disclosure, a memory card is provided, which may be used for matching wireless switches mainly by associated identity codes. For example, respective identity codes are set in one wireless transmitting switch and one controlled component (for example, an electric lamp) having a wireless receiver, in which each identity code is stored in a memory chip, and the memory chips are pluggably inserted into the wireless transmitting switch and the wireless receiver respectively. Only when identity codes plugged in the wireless transmitting switch and the wireless receiver are associated with each other (for example, identical with each other), the wireless receiver may control the controlled component according to a control instruction transmitted by the wireless transmitting switch. However, because in a complex application scenario, relations among memory chips in which identity codes are set are very complex, and even if the user is allowed to write identity codes in a field programmable manner, it is still very inconvenient for the user. Therefore, according to an embodiment of the present disclosure, memory chips having associated identity codes are all disposed on one memory card body, thus facilitating the use of the user. A plurality of memory chips, for example, 4, 8 or 20 memory chips, may be disposed on one memory card according to requirements.

Figure 9:
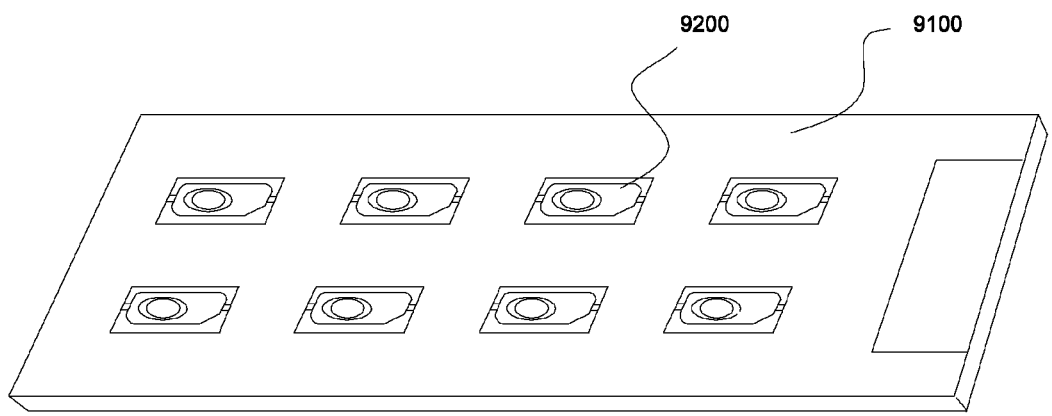
FIG. 9 is a perspective view of a memory card for matching wireless apparatuses or identifying a wireless apparatus according to an embodiment of the present disclosure.

FIG. 9 is a perspective view of a memory card for matching wireless apparatuses or identifying a wireless apparatus according to an embodiment of the present disclosure. The memory card comprises a memory card body 9100, in which a plurality of regions for containing a plurality of memory chips are disposed. The memory card further comprises a plurality of memory chips 9200, storing identity codes, and connected with the memory card body 9100 through a plurality of breakable connection structures to fix the plurality of memory chips 9200 in corresponding regions respectively, in which identity codes stored in at least part of the plurality of memory chips 9200 are associated with each other. In this way, the memory chips 9200 may be conveniently taken down from the memory card body 9100 by the above mentioned breakable connection structures, thus facilitating the use of the user. Each memory chips may have a rectangular shape, and a small part of the memory card may be extended outward after the memory card is inserted into a corresponding apparatus, so that the memory chips may be plugged or unplugged conveniently. Certainly, the whole memory chips may also be inserted into a corresponding apparatus. For example, after two memory chips 9200 having the same identity code are taken down from the memory card body 9100 by the user, a wireless switch and a controlled electric apparatus may be matched after the two memory chips 9200 are inserted into the wireless switch and the controlled electric apparatus (for example, a lighting device) having a wireless receiver corresponding to the wireless switch respectively.

The above mentioned identity codes associated with each other indicates the control relationship between each wireless switch and each wireless receiver, for example, if there is a one-to-one control relationship between each wireless switch and each wireless receiver, the identity codes stored in two memory chips are the same; and if the above mentioned memory card comprises ten groups of memory chips with each group has two memory chips, the same identity code is stored in the two memory chips in each group, and different among groups, the memory card has 10 group of memory chips having different identity codes. In order to ensure that the identity codes are not repeated, the length of each identity code may be 64 or 128 bits, and in the future, in order to achieve automated control network, each identity code may be managed as one IPv6 address.

If in a more complex application scenario, for example, in a street lamp controlling or a building application, there may be a one-to-multiple or multiple-to-multiple control relationship among the wireless switches and the wireless receivers. For this case, assuming that the memory card comprises a memory chip 1, a memory chip 2, a memory chip 3 and a memory chip 4, the memory chip 1 may have an identity code identical with that of the memory chip 3 and the memory chip 4 (certainly, the memory chip 3 and the memory chip 4 may also comprise a plurality of identity codes), meanwhile, the memory chip 4 may have an identity code identical with that of the memory chip 2 and the memory chip 3, thus achieving one-to-multiple control and multiple-to-multiple control respectively. Therefore, for this case, these memory chips may be all disposed on one memory card, so that the user may match the wireless switches and the wireless receivers onsite conveniently.

In addition, in a smart home application, a 128-bit identity code may correspond to an IP address in IPv6, an identity card is inserted into each controlled node, and the identity code and the node may be bound and matched by inserting the identity card in an intelligent terminal or inputting the identity code in the intelligent terminal, which is more simple and more convenient compared with other matching method such as a studying mode, a searching mode, etc. Therefore, in one embodiment, one memory card may comprise a plurality of memory chips storing different 128-bit identity codes, so that the user may set up a local area network conveniently.

Figure 10:
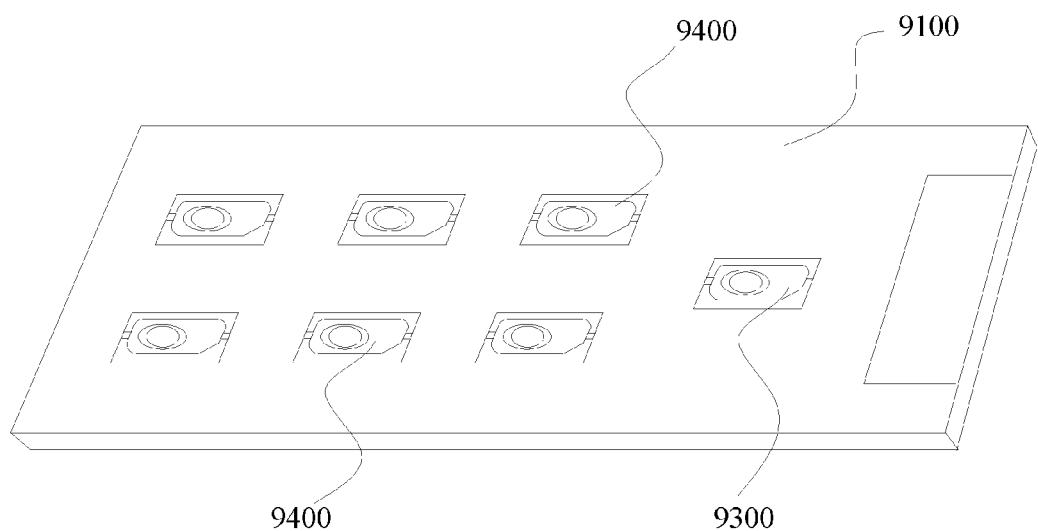
FIG. 10 is a perspective view of a memory card for identifying a wireless apparatus according to an embodiment of the present disclosure.

In a future smart home application, because there will be a plurality of different apparatuses, for example, an electric refrigerator, a television or an air conditioner, when the apparatuses are connected, it is first required that the household apparatuses are identified by an intelligent control terminal. For example, in some embodiments, the memory chips in the memory card may be divided into a main card and a daughter card (sub-card). As shown in FIG. 10, the memory card comprises one main card 9300 and a plurality of daughter cards 9400. Identity codes and necessary informations (for example, a channel assignment code and an apparatus type code) corresponding to different types of apparatus are stored in the daughter cards 9400, and corresponding identity codes and apparatus type informations stored in all the daughter cards 9400 are stored in the main card 9300. The channel assignment code is used for assigning a corresponding channel for an apparatus, and the apparatus type code may allow an apparatus where the main card 9300 is located to distinguish which type an apparatus transmitting an identity code is. For example, a refrigerator has a corresponding refrigerator type code, so that an intelligent control terminal may send a control instruction to the refrigerator according to the refrigerator type code.

After the user starts the intelligent control terminal, the intelligent control terminal sends an acknowledgement signal comprising the identity code of each apparatus to surrounding apparatuses according to information in the main card 9300, and detects which apparatus exists, that is, the acknowledgement signal is only sent to apparatuses with daughter cards 9400 which are disposed on the same memory card as the main card 9300. If the acknowledgement signal is received by the surrounding apparatuses, identity codes received by the surrounding apparatuses are compared with identity codes in the daughter cards 9400 inserted into the apparatuses. When identity codes received by the surrounding apparatuses conform to identity codes in the daughter cards 9400 inserted into the apparatuses, the surrounding apparatuses send information back to the intelligent control terminal to show that they are online and may be controlled by the intelligent control terminal. In this way, the intelligent control terminal creates a new apparatus list information or updates an apparatus list information in its information database, and when necessary, the intelligent control terminal sends an instruction information to a designated apparatus or receives an instruction information from a designated apparatus for communication. According to an embodiment of the present disclosure, identification among different types of apparatuses may be performed using identity codes in memory chips, and in order to facilitate the use of the user, associated memory chips are integrated in one memory card. In this way, identification among the intelligent control terminal and the apparatuses may be fully automatically performed without manual intervention, the fact that the intelligent control terminal controls apparatuses of other families or apparatuses of one family are not controlled by the intelligent control terminal of the one family may not appear, and an apparatus manufacturer may not consider identification problem among his apparatus and other apparatuses at all. Identification among apparatuses may be completely determined by relationships among different identity codes stored in the memory card.

In one embodiment, the memory card body 9100 is a plastic component, and each connection structure is a plastic connection bar. Certainly, other materials may be selected by those skilled in the art to form the memory card body 9100.

In one embodiment, a channel assignment code is also stored in each memory chip 9200 for assigning a corresponding channel for an apparatus in which each memory chip 9200 is inserted. In this way, for a complex application scenario, different channels may be assigned for different apparatuses, so that the apparatuses may not interfere with each other.

In one embodiment, apparatus type codes each corresponding to one apparatus, for example, a refrigerator or a television, are also stored in each memory chip 9200, so that an intelligent control terminal may assign corresponding control instructions conveniently.

In one embodiment, the memory chips 9200 in the memory card adopt the same cipher key, and different memory cards have different cipher keys, so that one memory card and other memory cards bought by one family may not control each other. In one embodiment, each memory chip 9200 adopts a cryptographic algorithm and a cipher key which match each other.

In one embodiment, each memory chip 9200 may be a single line memory. Because the storage amount is small, a single line memory may be used. The data rate of the single line memory is low, however, it is high enough for application in the present disclosure, thus reducing the manufacturing cost of the memory chips largely.

In one embodiment, the length of each identity code is 8 bits to 2 k bits, preferably 64 bits, 128 bits or 256 bits. When the length of each identity code is 128 bits, the each identity code corresponds to an IP address in IPv6. Each identity code in the memory card is a code constituted by a group of digits. On one hand, these identity codes may be pre-written or programmed in memory chips, for example, using a 128-bit code randomly generated, and due to huge sample space of the 128-bit random code, it is substantially ensured that the 128-bit random code may not be repeated. One random code is generated by a random number generator, and written in a memory chips according to requirements. In this way, the random code may be generated randomly and assigned artificially, thus ensuring that the random code will not be repeated and meeting required relationships. On the other hand, a compiled random code may also be generated artificially, or may also be randomly generated in a certain designated digital section. For example, in an application of internet of things, a section of identity code is assigned for a certain type of apparatus. Before the memory cards leaves a factory, these informations have been already written, and the user may only need to take a memory card home and insert the memory chips into an apparatus for matching. If in a complex application scenario, a programmable memory chip or disposable writable card may be used, and required identity codes are field programmable for matching.

In one embodiment, the memory card body 9100 further comprises identification information, for example, a bar code, so as to distinguish the memory cards. Meanwhile, a blank region in which words may be printed may also be set on the memory card body 9100, so that the user may mark identification information on the blank region. For example, when there are remaining chips after matching is completed, informations such as "bedroom lamp" or "kitchen lamp" may be marked for use when sometime searching, replacement or changing.

In one embodiment, each memory chip 9200 may be a non-volatile memory, for example, a single line memory, a read-only memory, a programmable memory, Flash memory or EEPROM memory.

The memory card according to an embodiment of the present disclosure has the following advantages.

(1) With the memory card according to an embodiment of the present disclosure, by setting a plurality of associated memory chips in one memory card, the user may match the wireless control assembly conveniently. Moreover, the memory chips are connected with the memory card body through a plurality of breakable connection structures respectively, thus taking down the memory chips from the memory card is simple. Therefore, for the user, the memory card according to an embodiment of the present disclosure is convenient and easy-to-use; when a wireless switch and a wireless receiver are bought, only a corresponding memory card needs to be bought; for a particular configuration, identification and matching among wireless apparatuses may be achieved by inserting memory chips having the same identity codes; and in one memory card all the matching information (an identity code in each memory chip) required by matching the transmitting and receiving apparatuses which need to be matched are comprised. As a result, the user may only need to pluggably mount memory chips comprising identification and matching information to a corresponding apparatus according to requirements, matching is also very flexible, the user may match a plurality of transmitters and a plurality of receivers together according to requirements by mounting memory chips with same identification codes in these apparatus respectively, and modification or reconfiguration of the apparatus controlling relationships are very convenient and fast.

(2) The memory card according to an embodiment of the present disclosure also has advantages of cost reduction for a manufacturer. With the memory card according to an embodiment of the present disclosure, an apparatus is separated from a matching information (i.e., an identity code in a memory chip), thus wireless switches or receiving control apparatuses may be produced standardly without the matching problems; and the required matching information may be achieved by the associated identity codes in the memory card, thus reducing the cost during the production and testing process. Moreover, for a current semiconductor memory production process, such a small-capacity non-volatile memory has very low cost, for example, even as low as a few cents per memory chips, and consequently the price of the whole memory card may be very low, which is economically feasible. With the memory card according to an embodiment of the present disclosure, during the production, the manufacturer may first standardly produce a memory card body, a blank memory chip is disposed on the memory card body, and then the same identity codes are written into all the chips in the card according to requirements to finish the production.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. A memory card for matching wireless apparatuses or identifying a wireless apparatus, comprising:
    a memory card body, with a plurality of regions for containing a plurality of memory chips; and
    a plurality of memory chips, storing identity codes, and connected with the memory card body through a plurality of breakable connection structures to fix the plurality of memory chips in corresponding regions respectively, in which identity codes stored in at least part of the plurality of memory chips are associated with each other for matching the wireless apparatuses or identifying the wireless apparatus.

2. The memory card according to claim 1, wherein identity codes stored in at least part of the plurality of memory chips are identical with each other for matching the wireless apparatuses.

3. The memory card according to claim 1, wherein a wireless channel assignment code is also stored in each memory chip for assigning a corresponding wireless channel for an apparatus in which each memory chip is inserted.

4. The memory card according to claim 1, wherein apparatus type codes each corresponding to one apparatus are also stored in each memory chip.

5. The memory card according to claim 1, wherein each memory chip adopts a cryptographic algorithm and a cipher key which match each other.

6. The memory card according to claim 1, wherein each memory chip is a single line memory, a read-only memory, a field programmable memory, Flash memory or EEPROM memory.

* * * * *